United States Patent
Foster

(10) Patent No.: US 6,389,974 B1
(45) Date of Patent: May 21, 2002

(54) PASSIVE DOPPLER FUZE

(75) Inventor: Carl G. Foster, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/556,222

(22) Filed: Apr. 24, 2000

(51) Int. Cl.$^7$ ............................................. F42C 13/04
(52) U.S. Cl. ...................... 102/211; 102/211; 102/214; 102/213
(58) Field of Search ................................ 102/211, 213, 102/214; 342/68, 166, 418

(56) References Cited

U.S. PATENT DOCUMENTS

| | | | | |
|---|---|---|---|---|
| 2,939,004 A | * | 5/1960 | Cole et al. ................... | 102/211 |
| 3,011,166 A | * | 11/1961 | Fell et al. .................... | 102/211 |
| 3,230,478 A | * | 1/1966 | Page .......................... | 102/214 |
| 4,118,702 A | * | 10/1978 | Rabinow ..................... | 102/211 |
| 4,185,560 A | * | 1/1980 | Levine ....................... | 102/214 |
| 4,218,977 A | * | 8/1980 | Kalmus ....................... | 102/214 |
| 4,354,192 A | * | 10/1982 | Kohler ........................ | 102/214 |
| 4,360,812 A | * | 11/1982 | Peperone .................... | 102/214 |
| 4,414,549 A | * | 11/1983 | Wichmann | |
| 5,078,052 A | * | 1/1992 | Brogi ......................... | 102/213 |

* cited by examiner

Primary Examiner—Michael J. Carone
Assistant Examiner—Lulit Semunegus
(74) Attorney, Agent, or Firm—William J. Benman; Colin M. Raufer; Glenn H. Lenzen, Jr.

(57) ABSTRACT

A passive proximity fuze. The inventive fuze (10) is adapted to be mounted on a munition (11) and includes a receiver (16) adapted to lock on to a signal transmitted by a target transmitter (12). The receiver (16) detects a Doppler shift in the signal as the munition approaches the target. When a closest point of approach is reached the Doppler shift changes from increasing to decreasing. The inventive fuze (10) includes a mechanism for detecting this change in the Doppler shift and provides a detonation signal in response thereto. In the illustrative embodiment, the receiver (16) is an FM receiver. The mechanism for detecting a change in the Doppler shift may be implemented with discrete analog circuitry or digital circuitry. In an illustrative analog implementation, first and second resistive/capacitive networks ($R_1C_1$ and $R_2C_2$) are employed to compute a second derivative of the Doppler shift signal output by the receiver (16). This signal is then amplified and thresholded to provide the output detonation signal. In an illustrative digital implementation, the output of the receiver (16) is converted to digital and processed by a digital signal processor (26). The DSP 26 computes the second derivative of the Doppler shift signal output by the receiver (16) in response to a stored program for computing same. The output of the DSP is the detonation signal. Hence, detonation is achieved at the closest point of approach of the munition (11) to the target (12) with an inexpensive passive solution (10).

7 Claims, 2 Drawing Sheets

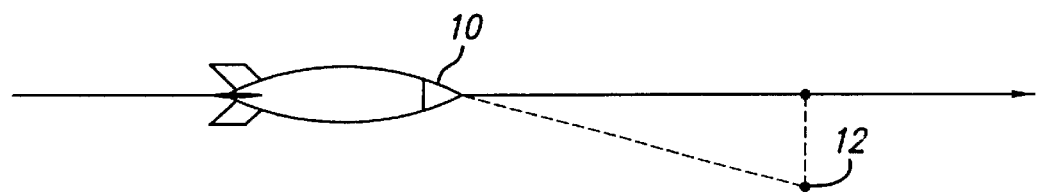
FIG. 1
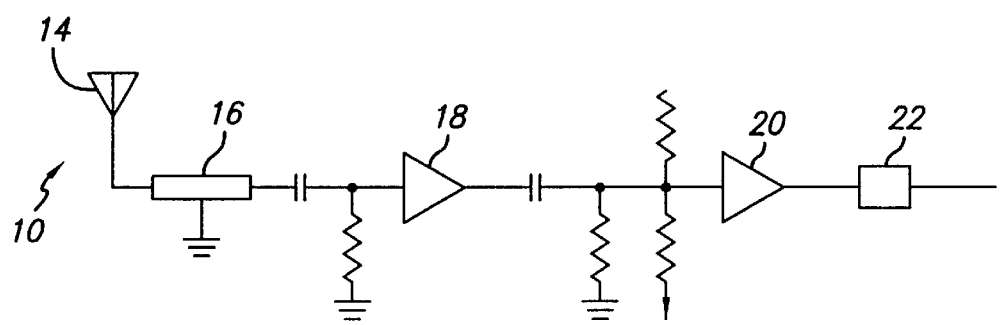
FIG. 2A
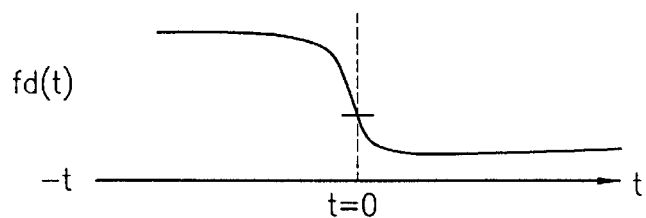
FIG. 2B
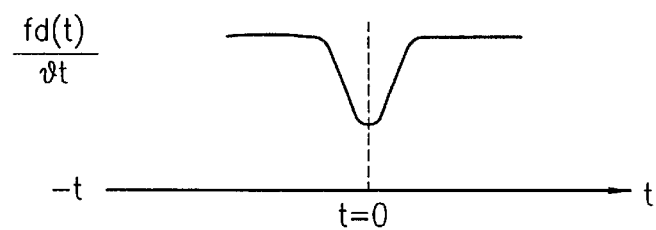

PASSIVE DOPPLER FUZE

BACKGROUND OF THE INVENTION

1. Field of the Invention

The present invention relates to electronic circuits and systems. More specifically, the present invention relates to electronic fuzes used in weapon systems.

2. Description of the Related Art

For many applications, there is a need to provide a fuze for a munition. For certain applications, a low-cost, passive proximity fuze is needed. For example, the Global Positioning System (GPS) is currently being used to provide accurate munitions guidance to target via a constellation of satellites. It is anticipated that the use of a plurality of low cost GPS transmitters may be deployed as a countermeasure to thwart the GPS guidance system of a missile or other munition in flight.

Hence, there is a need for a munition capable of homing in on and destroying a GPS jammer. The jamming transmitters would be small and elevated making destruction problematic. Low cost missiles are therefore currently being considered for this application. The missiles would be traveling at high speed and therefore would typically require both a guidance system and a fuze. The guidance system would steer the weapon to the target and attempt to impact it, and an RF fuze would be needed to fuze the weapon if it missed the target and the impact fuze does not function. This would add considerably to the cost of the munition in that a radar transmitter, receiver, and signal processor would typically be required. With respect to the passive fuze approach, no known RF fuze would suffice and an active fuze would be expensive in the requirement of a radar transmitter system or other active detection methodology.

Unfortunately, the interfering jammers are anticipated to be low cost jammers deployed in large numbers. Accordingly, the high costs associated with the above-described active fuze and precision guidance system approaches for the anti-jammer munition render these approaches impractical. In addition, the guidance system and the active fuze approaches would also adversely impact the form factor of the solution.

Hence, a need remains in the art for a low cost-effective alternative to allow for the use of an inexpensive munition to destroy small, inexpensive jamming signal source targets.

SUMMARY OF THE INVENTION

The need in the art is addressed by the passive proximity fuze of the present invention. The inventive fuze is adapted to be mounted on a munition and includes a receiver adapted to lock on to a signal transmitted by a jamming transmitter. The receiver detects a Doppler shift in the signal as the munition approaches the target. When a closest point of approach is reached the Doppler shift changes from increasing to decreasing. The inventive fuze includes a mechanism for detecting this change in the Doppler shift and provides a detonation signal in response thereto.

In the illustrative embodiment, the receiver is an FM receiver. The mechanism for detecting a change in the Doppler shift may be implemented with discrete analog circuitry or digital circuitry. In an illustrative analog implementation, first and second resistive/capacitive (RC) networks are employed to compute a second derivative of the Doppler shift signal output by the receiver. This signal is then amplified and thresholded to provide the output detonation signal.

In an illustrative digital implementation, the output of the receiver is converted to digital and processed by a digital signal processor (DSP). The DSP computes the second derivative of the Doppler shift signal output by the receiver in response to a stored program for computing same. The output of the DSP is the detonation signal. Hence, detonation is achieved at the closest point of approach of the munition to the target with an inexpensive passive solution.

BRIEF DESCRIPTION OF THE DRAWINGS

FIG. 1 is a diagram which depicts an operational environment of the proximity fuze of the present invention.

FIG. 2 is a schematic diagram of an illustrative analog implementation of the fuze of the present invention.

FIG. 2a is a diagram depicting the Doppler shift $f_d(t)$ of the received signal as a function of time.

FIG. 2b is a diagram depicting a first derivative of the Doppler shift $f_d(t)$ of the received signal as a function of time.

DESCRIPTION OF THE INVENTION

Figure 2C:
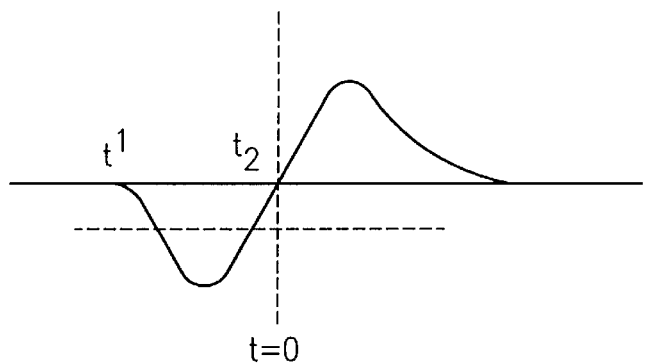
FIG. 2c is a diagram depicting a second derivative of the Doppler shift $f_d(t)$ of the received signal as a function of time.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is a diagram which depicts an operational environment of the proximity fuze of the present invention. The inventive fuze 10 is adapted to be used on a munition 11 for destruction of a jamming transmitter 12.

FIG. 2 is a schematic diagram of an illustrative analog implementation of the fuze of the present invention. The fuze 10 includes an antenna 14 that receives a signal transmitted by the jamming transmitter 12 of FIG. 1 and provides it to a receiver 16. In the best mode, the receiver 16 is adapted to receive frequency modulated (FM) signals and provide an output in response thereto. Preferably, the receiver 16 is tunable to enable use against jammer operating at various carrier frequencies. The receiver 16 outputs a signal indicative of a Doppler shift in a carrier signal transmitted by the jammer 12 as the munition 11 approaches. The Doppler shift phenomenon is well known in the art. When a periodic signal is transmitted between a source and a receiver which are in motion relative to one another, a shift in the periodicity of the received signal may be detected. This shift is known as the Doppler shift for which the associated Doppler frequency $f_d$ is given by:

$$f_d = V \cdot f_t \cos \alpha / c \qquad [1]$$

where $f_t$ is the frequency of the transmitter;

V=velocity of the munition 11;

c=the speed of light; and

α=the angle between the line-of-flight and the transmitter 12 as depicted in FIG. 1.

As a function of time, equation [1] may be expressed as:

$$f_d(t) = V \cdot f_t V t / c \cdot (V^2 t^2 + m^2)^{1/2} \quad [2]$$

where 'm' is the miss distance.

The objective is to detonate, or fuze, the 11 at the point of closest approach to the jamming transmitter 12. In accordance with the present teachings, the closest point of approach is detected by taking the second derivative of $f_d(t)$ and detecting the point of inflection thereof (i.e., when the second derivative crosses zero). This is depicted in FIGS. 2a–c as described more fully below.

FIG. 2a is a diagram depicting the Doppler shift $f_d(t)$ of the received signal as a function of time.

FIG. 2b is a diagram depicting a first derivative of the Doppler shift $f_d(t)$ of the received signal as a function of time.

FIG. 2c is a diagram depicting a second derivative of the Doppler shift $f_d(t)$ of the received signal as a function of time. In FIGS. 2–c, the point of closest approach is at t=0.

Returning to FIG. 2, in the analog implementation, the closest point of approach is detected by two RC networks, $R_1 C_1$ and $R_2 C_2$, and a comparator. As will be appreciated by one of ordinary skill in the art, the RC networks are connected as high pass filters to differentiate the Doppler signal output by the receiver 16. Hence, the first RC network $R_1 C_1$ provides a first derivative of the Doppler signal output by the receiver 16 while the second RC network $R_2 C_2$ outputs a second derivative of the Doppler signal output by the receiver 16. An amplifier 18 is disposed between the first and second RC stages to decouple the two networks.

A comparator 20 compares the output of the second differentiator $R_2 C_2$ to a threshold set by a voltage divider network consisting of resistors $R_3$ and $R_4$ connected to a reference terminal thereof. The voltage divide essentially determines the range at which the fuze detonates.

Figure 3:
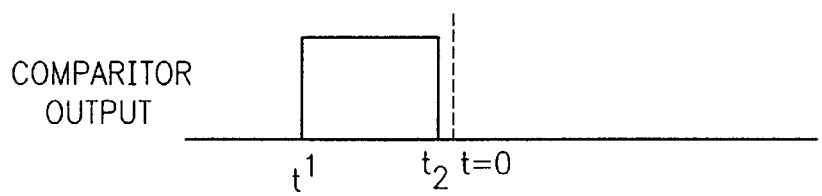
FIG. 3 is a diagram which depicts the output of the comparator of the inventive fuze.

FIG. 3 is a diagram which depicts the output of the comparator of the inventive fuze. As depicted in FIG. 3, the output of the comparator goes low at $t_1$ when the second derivative of the Doppler shift first crosses the comparator threshold voltage $V_T$ and goes high when the second derivative of the Doppler shift crosses the threshold voltage $V_T$ for a second time at $t_2$.

Figure 4:
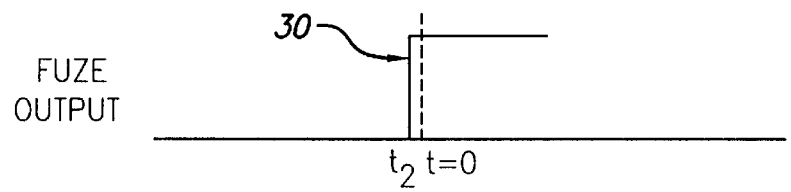
FIG. 4 is a diagram which depicts the output of the fuze of the present invention.

FIG. 4 is a diagram which depicts the output of the fuze of the present invention. As depicted in FIG. 4, at $t_2$ the munition is triggered and explodes at the closest point of approach at t=0.

Returning to FIG. 2, the output of the comparator 20 may be connected to an analog-to-digital (or analog-to-TTL) converter 22 to provide a digital output pulse if needed.

Figure 5:
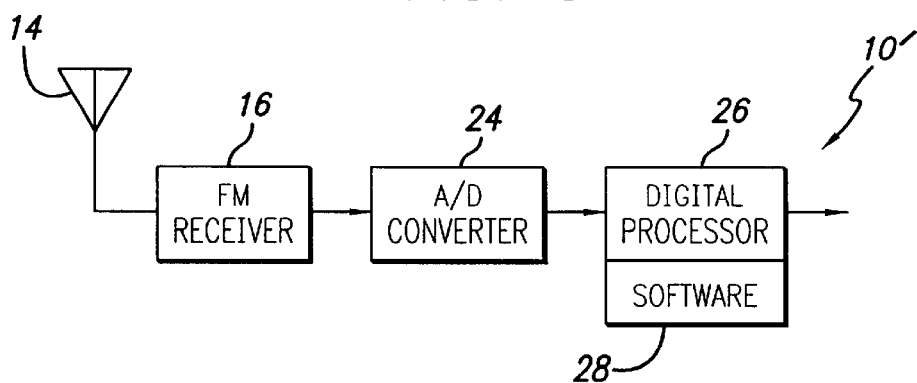
FIG. 5 shows an alternative digital implementation of the fuze of the present invention.

FIG. 5 shows an alternative digital implementation of the fuze of the present invention. In the digital implementation, the fuze 10' includes an analog to digital converter 24 which digitizes the output of the receiver 16 and provides the digitized Doppler shift to a digital signal processor (DSP) 26. The DSP may be implemented with a microprocessor or programmable logic gate as will be appreciated by one of ordinary skill in the art. In a microprocessor implementation, the DSP runs software (depicted generally at 28) to successively compute the second derivative of the Doppler shift of the signal and provides an output signal in response thereto.

Those skilled in the all will appreciate that the present invention is not limited to the illustrative implementations and that the passive Doppler fuze of the present invention operates independently of the absolute frequency of the transmitted signal.

Thus, the present invention has been described herein with reference to a particular embodiment for a particular application. Those having ordinary skill in the art and access to the present teachings will recognize additional modifications, applications and embodiments within the scope thereof.

The invention could also be used to hit any transmitter. For instance, a transmitter can be attached to an aircraft or ground vehicle that is used to assist the homing guidance unit to locate the target. The invention is used to fuze the explosive charge even if the guidance system, in conjunction with the aerodynamic controls, misses the target.

The invention can be used to attack any transmitter that is deemed to be a military target. It will work against broadcast antennas.

It is therefore intended by the appended claims to cover any and all such applications, modifications and embodiments within the scope of the present invention.

Accordingly,

What is claimed is:

1. A passive fuze comprising:

a receiver adapted to detect a signal from an active signal source;

a first circuit electrically connected to said receiver for detecting Doppler shift in said signal and providing a Doppler signal in response thereto; and a second circuit for computing a second derivative of said Doppler signal and providing an output signal in response thereto.

2. The invention of claim 1 wherein said second circuit includes first a resistor and capacitor network for differentiating said Doppler signal and providing a differentiated Doppler signal.

3. The invention of claim 2 wherein said second circuit includes a second resistor and capacitor network for differentiating said differentiated Doppler signal.

4. The invention of claim 3 further including an amplifier disposed between said first and said second resistor and capacitor networks.

5. The invention of claim 3 further including means for comparing the output of said second resistor and capacitor network to a predetermined threshold.

6. The invention of claim 1 wherein said second circuit includes a digital signal processor.

7. The invention of claim 6 wherein said second circuit includes software for execution by said digital signal processor to compute a second derivative of said Doppler signal and provide an output signal in response thereto.

* * * * *